(12) United States Patent
Kim et al.

(10) Patent No.: US 11,435,435 B2
(45) Date of Patent: Sep. 6, 2022

(54) RADAR DEVICE

(71) Applicant: SMART RADAR SYSTEM, INC., Seongnam-si (KR)

(72) Inventors: Yong Jae Kim, Yongin-si (KR); Jae Yong Lee, Anyang-si (KR); Kyoung Sub Oh, Hwaseong-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 272 days.

(21) Appl. No.: 16/477,190

(22) PCT Filed: Mar. 27, 2019

(86) PCT No.: PCT/KR2019/003543
§ 371 (c)(1),
(2) Date: Jul. 11, 2019

(87) PCT Pub. No.: WO2019/190186
PCT Pub. Date: Oct. 3, 2019

(65) Prior Publication Data
US 2020/0333432 A1    Oct. 22, 2020

(30) Foreign Application Priority Data

Mar. 27, 2018  (KR) .................. 10-2018-0035462
Mar. 27, 2018  (KR) .................. 10-2018-0035463

(51) Int. Cl.
*G01S 13/58*       (2006.01)
*G01S 7/03*        (2006.01)
(Continued)

(52) U.S. Cl.
CPC .............. *G01S 7/03* (2013.01); *G01S 7/352* (2013.01); *G01S 13/584* (2013.01); *H01Q 21/06* (2013.01);
(Continued)

(58) Field of Classification Search
CPC .. G01S 13/584; G01S 13/4454; G01S 13/449; G01S 13/886; G01S 13/931;
(Continued)

(56) References Cited

U.S. PATENT DOCUMENTS 7,283,085 B2   10/2007   Lee et al.
9,435,884 B2 *  9/2016   Inoue ................. G01S 13/346
(Continued)

FOREIGN PATENT DOCUMENTS

JP       2000-028712 A    1/2000
JP       2010-071865 A    4/2010
(Continued)

OTHER PUBLICATIONS

Notice of Allowance dated Aug. 5, 2019 for Korean Application No. 10-2018-0035463.
(Continued)

*Primary Examiner* — Timothy A Brainard
(74) *Attorney, Agent, or Firm* — Insight Law Group, PLLC; Seung Lee

(57) ABSTRACT

Disclosed herein is a radar device. The radar device can implement a virtual antenna with high spatial resolution having a two-dimensional (2D) distribution of received beams using a plurality of transmitting and a plurality of receiving antennas.

9 Claims, 21 Drawing Sheets

(51) Int. Cl.
*G01S 7/35* (2006.01)
*H01Q 21/06* (2006.01)
*G01S 13/34* (2006.01)
*G01S 13/88* (2006.01)
*G01S 13/931* (2020.01)

(52) U.S. Cl.
CPC .......... *G01S 13/345* (2013.01); *G01S 13/886* (2013.01); *G01S 13/931* (2013.01)

(58) Field of Classification Search
CPC ......... G01S 7/03; G01S 7/352; H01Q 1/3233; H01Q 21/06; H01Q 21/28; H01Q 25/00
See application file for complete search history.

(56) References Cited

U.S. PATENT DOCUMENTS

| | | | |
|---|---|---|---|
| 9,817,110 | B2 | 11/2017 | Koerber et al. |
| 2004/0178951 | A1* | 9/2004 | Ponsford ............. G01S 7/2921 342/194 |
| 2009/0007839 | A1 | 1/2009 | Ebara |
| 2014/0368374 | A1 | 12/2014 | Choi et al. |
| 2016/0018511 | A1 | 1/2016 | Nayyar et al. |
| 2016/0146931 | A1* | 5/2016 | Rao ....................... G01S 13/931 342/59 |
| 2017/0082730 | A1* | 3/2017 | Kishigami ........... H01Q 21/061 |
| 2017/0141454 | A1* | 5/2017 | Welle ....................... G01S 7/03 |
| 2017/0299694 | A1* | 10/2017 | Ito ......................... G01S 7/4026 |
| 2017/0329002 | A1 | 11/2017 | Koerber et al. |
| 2018/0106895 | A1 | 4/2018 | Koerber et al. |

FOREIGN PATENT DOCUMENTS

| | | |
|---|---|---|
| JP | 5086551 B2 | 11/2012 |
| JP | 2013-130475 A | 7/2013 |
| JP | 2015-132474 A | 7/2015 |
| JP | 2017-215328 A | 12/2017 |
| KR | 10-2006-0094096 A | 8/2006 |
| KR | 10-2011-0068758 A | 6/2011 |
| KR | 10-2014-0063720 A | 5/2014 |
| KR | 10-2014-0077155 A | 6/2014 |
| KR | 10-2014-0100774 A | 8/2014 |
| KR | 10-2014-0142014 A | 12/2014 |
| KR | 10-2014-0144826 A | 12/2014 |
| KR | 10-1553878 B1 | 9/2015 |
| KR | 10-1736713 B1 | 5/2017 |
| KR | 10-1777015 B1 | 9/2017 |
| WO | 2007/083476 A1 | 7/2007 |

OTHER PUBLICATIONS

International Search Report dated Jul. 12, 2019 for International Application No. PCT/KR2019/003543 and its English translation.
Notice of Allowance dated Jun. 26, 2020 from Korean Industrial Property Office for Korean Application No. 10-2018-0032462.
Korean office Action dated Jul. 7, 2019 for Korean Application No. 10-2018-0035462.
Jidong Wei et al., 3-Dimension Burden Surface Imaging System with T-Shaped MIMO Radar in the Blast Furnace, ISIJ International, vol. 55 (2015), No. 3, pp. 592-599.
European Search Report dated Mar. 12, 2020 for European Application No. 19733388.3.
Extended European Search Report dated Jan. 13, 2022 for European Application No. 19733388.3.

* cited by examiner

RADAR DEVICE

CROSS-REFERENCE TO RELATED APPLICATIONS

This application is a National Phase Entry of International Application No. PCT/KR2019/003543, filed on Mar. 27, 2019, which claims priority and benefits of Korean Application Nos. 10-2018-0035462, filed on Mar. 27, 2018, and 10-2018-0035463, filed on Mar. 27, 2018, the content of which is incorporated herein by reference in their entirety.

TECHNICAL FIELD

The present invention relates to an antenna array applied to a radar, and more particularly, to a radar device having a plurality of transmitting antennas and a plurality of receiving antennas.

BACKGROUND ART

Korean Patent Registered No. 10-1736713 (Apr. 31, 2017) discloses a radar array antenna in which a plurality of power feed lines and a plurality of array structures including a plurality of radiators coupled to the plurality of power feed lines are arrayed.

An antenna array structure of a vehicular radar device should be designed to have a concentratedly distributed surveillance region concentrating on only a region of interest, and an antenna array structure of a security radar device should be designed to have a widely distributed surveillance region.

In order to allow a radar device to be used for security or a vehicle, inventors of the present invention have studied a technique of arraying a plurality of transmitting antennas and a plurality of receiving antennas which are provided in the radar device.

DISCLOSURE

Technical Problem

The present invention is directed to providing a radar device which is capable of implementing a virtual antenna with high spatial resolution having a two-dimensional (2D) distribution of received beams using a plurality of transmitting antennas and a plurality of receiving antennas.

The present invention is also directed to providing a radar device which has a widely distributed surveillance region by arraying a plurality of transmitting antennas and a plurality of receiving antennas, which are provided in the radar device, to intersect with each other in the form of a straight or curved line.

The present invention is also directed to providing a radar device which has a concentratedly distributed surveillance region by arraying some antennas among a plurality of transmitting antennas and a plurality of receiving antennas, which are provided in the radar device, in the form of a straight line and arraying the remaining antennas thereamong to be alternated without arraying all of the plurality of transmitting antennas and the plurality of receiving antennas on straight lines.

The present invention is also directed to providing a radar device which is capable of removing a grating lobe, which is an undesirable radiation lobe, by implementing a distribution interval between received beams on a received beam distribution image to be less than or equal to half of a received wavelength.

The present invention is also directed to providing a radar device which is capable of reducing a side lobe by allowing a distribution of received beams on a received beam distribution image to be more concentrated on a center of the received beam distribution image.

Technical Solution

One aspect of the present invention provides a radar device including n radar signal processors, each of which include i transmission channels and j reception channels, configured to transmit radar signals through the i transmission channels, receive the radar signals reflected from a target object through the j reception channels, and process the received radar signals, thereby calculating a range to the target object and Doppler data for each of the j reception channels; n*i physical transmitting antennas connected to the i transmission channels of each of the n radar signal processors and configured to transmit the radar signals; n*j physical receiving antennas connected to the j reception channels of each of the n radar signal processors and configured to receive the radar signals reflected from the target object; and a controller configured to control operations of the n radar signal processors and generate a virtual antenna having a two-dimensional (2D) received beam distribution by driving the n*i transmitting antennas and the n*j receiving antennas with reference to antenna configuration related information.

According to an additional aspect of the present invention, the antenna configuration related information may define stationary array information on the n*i transmitting antennas and the n*j receiving antennas, driving sequence information on the n*i transmitting antennas and the n*j receiving antennas, and 2D received beam form information of a dynamic virtual antenna according to a driving sequence of the n*i transmitting antennas and the n*j receiving antennas.

According to an additional aspect of the present invention, the controller may calculate a position of the target object from virtual antenna mapping data in which the range to the target object and the Doppler data for each of the reception channels, which are calculated by the n radar signal processors, are rearranged according to a 2D received beam form of the virtual antenna with reference to the antenna configuration related information.

According to an additional aspect of the present invention, the n*i transmitting antennas and the n*j receiving antennas may be arrayed to intersect with each other in the form of a straight or curved line, thereby having a widely distributes surveillance region, and a distribution interval between received beams on a received beam distribution image may be implemented to be less than half of a received wavelength.

According to an additional aspect of the present invention, instead of all of the n*i transmitting antennas and the n*j receiving antennas being arrayed on straight lines, some antennas among the n*i transmitting antennas and the n*j receiving antennas may be arrayed on the straight lines and the remaining antennas thereamong may be arrayed to be alternated such that some positions of the received beams formed by the radar signals which are received by the n*j receiving antennas may be represented as spaces on a received beam distribution image as well as achieving the concentratedly distributed surveillance region, and a distribution interval of the received beams on the received beam distribution image may be implemented to be less than half of a received wavelength.

According to an additional aspect of the present invention, the n*i transmitting antennas may be continuously or discontinuously arrayed with respect to adjacent transmitting antennas.

According to an additional aspect of the present invention, the n*j receiving antennas may be continuously or discontinuously arrayed with respect to adjacent receiving antennas.

According to an additional aspect of the present invention, the controller may control the n radar signal processors whenever the n*i transmitting antennas sequentially or respectively transmit the radar signals transmits the radar signal so as to allow all of the n*j receiving antennas to collectively receive the radar signals.

According to an additional aspect of the present invention, the n*i transmitting antennas and the n*j receiving antennas may be arrayed so as to allow positions of the received beams formed by the radar signals which are received by the n*j receiving antennas to not overlap on the received beam distribution image.

Advantageous Effects

In accordance with the present invention, a virtual antenna with high spatial resolution can be implemented to have a two-dimensional received beam distribution using a plurality of transmitting antennas and a plurality of receiving antennas. Consequently, there is an effect in that a radar device can be provided to have high spatial resolution using a smaller number of physical transmitting and receiving antennas.

Further, in accordance with the present invention, the plurality of transmitting antennas and the plurality of receiving antennas, which are provided in the radar device, are arrayed to intersect with each other in the form of a straight or curved line, thereby having a widely distributed surveillance region. Consequently, there is an effect in that the radar device can survey a wide region.

Further, in accordance with the present invention, instead of all of the plurality of transmitting antennas and the plurality of receiving antennas, which are provided in the radar device, being arrayed on straight lines, some among the plurality of transmitting antennas and the plurality of receiving antennas are arrayed in the form of a straight line and the remaining antennas thereamong are arrayed to be alternated, thereby having a concentratedly distributed surveillance region. Consequently, there is an effect in that the radar device can concentratedly survey a region of interest.

Further, in accordance with the present invention, a distribution interval between received beams on a received beam distribution image is implemented to be less than or equal to half of a received wavelength, thereby removing a grating lobe, which is an undesirable radiation lobe. Consequently, there is an effect in that performance of the radar device can be improved.

Further, in accordance with the present invention, a distribution of the received beams on the received beam distribution image is implemented to be more concentrated on a center of the received beam distribution image, thereby reducing a side lobe. Consequently, there is an effect in that the performance of the radar device can be improved.

MODES OF THE INVENTION

Hereinafter, a description will be made in detail to describe exemplary embodiments of the present invention with reference to the accompanying drawings so as to allow a person skilled in the art to easily understand and practice the present invention. While specific embodiments have been illustrated in the accompanying drawings and described in this disclosure, they are not intended to limit various embodiments of the present invention to a specific form.

Moreover, in the following description of the present invention, if a detailed description of related known configurations or functions is determined to unnecessarily obscure the gist of embodiments of the present invention, a detailed description thereof will be omitted.

When a component is referred to as being "connected," or "coupled" to another component, it may be directly connected or coupled to another component, but it should be understood that yet another component may be present therebetween.

On the contrary, when a component is referred to as being "directly connected," or "directly coupled" to another component, it should be understood that yet another component may be absent therebetween.

Figure 1:
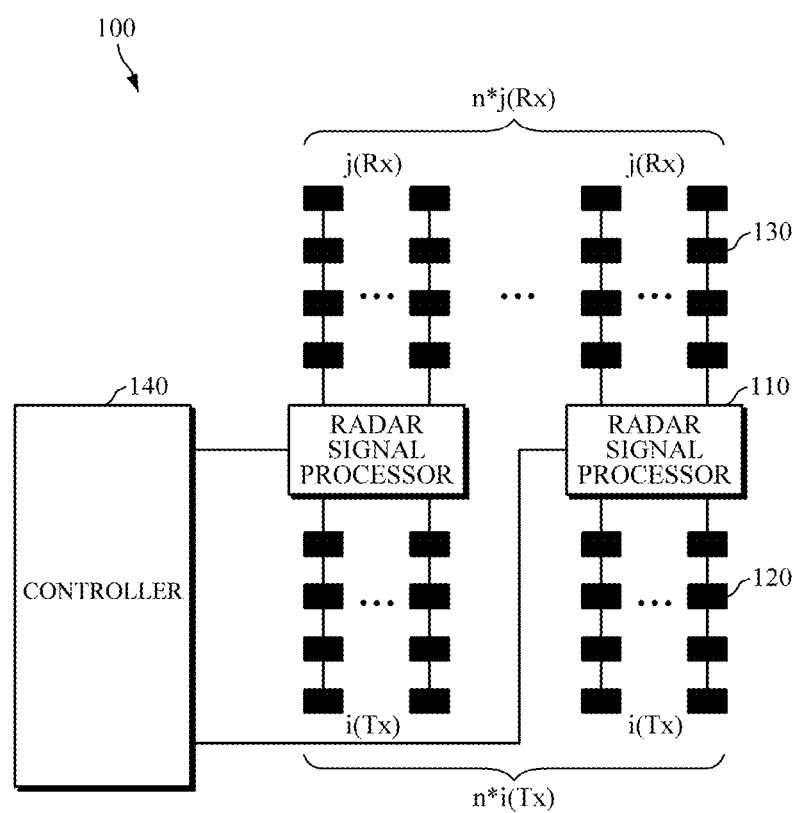
FIG. 1 is a block diagram illustrating a configuration of a radar device according to an embodiment of the present invention.

FIG. 1 is a block diagram illustrating a configuration of a radar device according to an embodiment of the present invention. As shown in FIG. 1, a radar device 100 according to the present invention includes n radar signal processors 110, n*i transmitting antennas 120, n*j receiving antennas 130, and a controller 140.

Each of the n radar signal processors 110 includes i transmission channels and j reception channels, transmits radar signals through the i transmission channels, receives the radar signals reflected from a target object (not shown) through the j reception channels, and processes the received radar signals, thereby calculating a range to the target object and Doppler data for each of the j reception channels.

Here, the range to the target object refers to a range in a sight direction (a radial distance) to the target object, and the Doppler data refers to a value relating to a speed in the sight direction (a radial speed).

The n*i transmitting antennas 120 are connected to the i transmission channels of each of the n radar signal processors 110 to transmit the radar signals. In this case, each of the n*i transmitting antennas 120 may include a power feed line and a plurality of patches disposed along the power feed line.

The n*j receiving antennas 130 are connected to the j reception channels of each of the n radar signal processors 110 to receive the radar signals reflected from the target object. In this case, each of the n*j receiving antennas 130 may include a power feed line and a plurality of patches disposed along the power feed line.

In this case, at least one of the n*i transmitting antennas 120 or the n*j receiving antennas 130 may be non-uniformly linearly deployed. For example, the n*i transmitting antennas 120 may be non-uniformly linearly deployed, whereas the n*j receiving antennas 130 may be uniformly linearly deployed.

Alternatively, the n*i transmitting antennas 120 may be uniformly linearly deployed, whereas the n*j receiving antennas 130 may be non-uniformly linearly deployed. Also alternatively, both of the n*i transmitting antennas 120 and the n*j receiving antennas 130 may be non-uniformly linearly deployed.

In a "non-uniform linear array," the term "linear" means that a plurality of antennas are deployed along a straight line or a curved line. Further, the term "non-uniform" means that an interval between a plurality of antennas is not constant. That is, the term "non-uniform linear array" is defined as meaning a form in which a plurality of antennas are linearly arrayed along a straight line or a curved line at non-uniform intervals.

Meanwhile, a transmitting antenna array and a receiving antenna array, at least one of which is non-uniformly linearly deployed, may be arrayed to intersect with each other or to not intersect therewith.

Meanwhile, the transmitting antenna array and the receiving antenna array, at least one of which is non-uniformly linearly deployed, may include not only a one-dimensional (1D) array but also a two-dimensional (2D) array. When at least one of a physical transmitting antenna array or a physical receiving antenna array is non-uniformly linearly deployed, a virtual antenna which has a 2D received beam distribution due to logically combining these transmitting and receiving antenna arrays has higher resolution.

The controller 140 controls operations of the n radar signal processors 110. In this case, the controller 140 may be implemented to control the n radar signal processors 110 whenever the n*i transmitting antennas 120 transmit radar signals sequentially or respectively so as to allow all of the n*j receiving antennas 130 to collectively receive the radar signals.

Meanwhile, the controller 140 may be implemented to analyze frequency signals which are output through the transmitting antennas 120 connected to each of the n radar signal processors 110 and a frequency shift of each of the frequency signals which are received through the receiving antennas 130, thereby detecting a target object and calculating a range to the target object.

For example, the controller 140 may be implemented to detect the target object and calculate a range to the target object using a frequency modulated continuous wave (FMCW).

Figure 2:
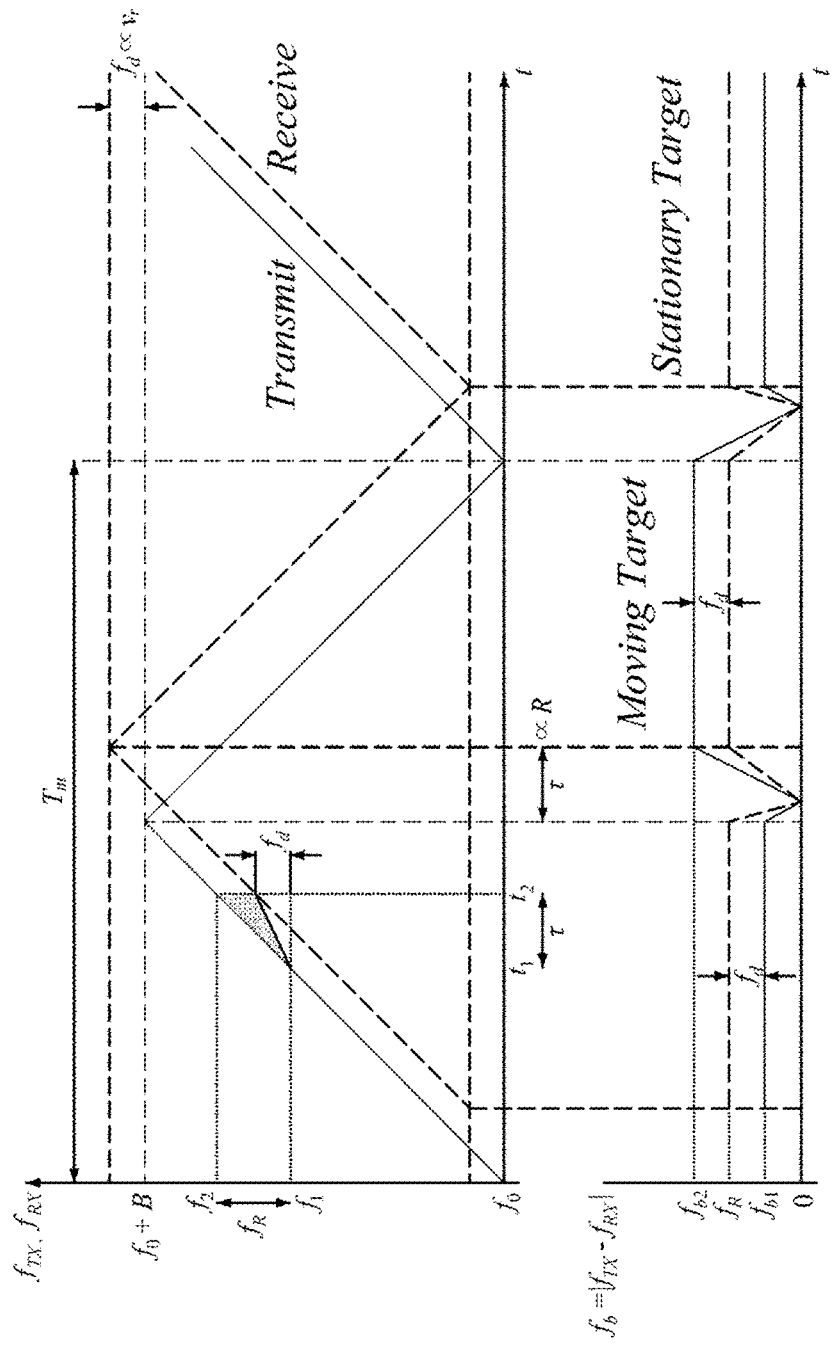
FIG. 2 is a diagram showing transmitted and received waveforms of frequency modulated continuous waves (FMCWs).

FIG. 2 is a diagram showing transmitted and received waveforms of FMCWs. A transmitted signal $f_{TX}$ sweeps with a bandwidth B corresponding to $f_0+B$ at a bandwidth frequency $f_0$ for a period of time $T_m$.

In FIG. 2, after a time delay of $\tau=2R/C$, a signal $f_1$ transmitted at time $t_1$ is observed as having a frequency shift of $f_d$ at time $t_2$, and a signal transmitted at time $t_2$ has a frequency of $f_2$.

A bit frequency $f_b$ which is a difference between the transmitted signal $f_{TX}$ and a received signal $f_{RX}$ is detected as the following Equation 1.

$$f_b = |f_{TX} - f_{RX}| \qquad \text{[Equation 1]}$$

$$R = \frac{T_m E_c E F_{b,stationary}}{4B} \qquad \text{[Equation 2]}$$

The controller 140 may simply use Equation 2 to calculate a range to a stationary target object using the bit frequency $f_b$. Since a center frequency of the received signal is shifted due to the Doppler effect when a target object is moving, two bit frequencies may be generated by a mixer 320 as in Equations 3 and 4 according to whether a transmitted signal at a predetermined time is present at an ascending slope or a descending slope of a triangle wave.

$$f_{b1}=f_R-f_d \qquad \text{[Equation 3]}$$

$$f_{b2}=f_R+f_d \qquad \text{[Equation 4]}$$

A range to the moving target object and a relative speed with respect thereto may be calculated by Equations 5 and 6 using the bit frequencies calculated by Equations 3 and 4.

$$R = \frac{c(f_{b1} + f_{b2})T_m}{8B} \quad \text{[Equation 5]}$$

$$V_r = \frac{c(f_{b1} - f_{b2})}{4f_0} \quad \text{[Equation 6]}$$

Here, a variable $f_0$ means a frequency of the transmitted signal. An intermediate frequency (IF) signal of the bit frequency $f_b$ is a square wave having a period of $T_m/2$. When the IF signal is Fourier transformed and expressed in a frequency domain, the IF signal is expressed as a sinc function having a center frequency of $f_b$.

In this case, an initial zero crossing point appears at a period of $2/T_m$, and a reciprocal value of the initial zero crossing point becomes a minimum modulation frequency and may be expressed by Equation 7. Further, when detection resolution of the relative speed is calculated using Equation 7, the detection resolution may be expressed by Equation 8.

$$\Delta f = \frac{2}{T_m} \quad \text{[Equation 7]}$$

$$\Delta V_r = \frac{c}{2f_0}E\Delta f = \frac{c}{f_0}E\frac{1}{T_m} \quad \text{[Equation 8]}$$

$$\Delta R = \frac{cET_m}{4B}E\Delta f = \frac{c}{2B} \quad \text{[Equation 9]}$$

It can be seen from Equation 8 that, as a value of Tm increases or a value of the minimum modulation frequency Δf decreases, the relative speed may be detected with higher resolution. Further, Equation 9 represents range detection resolution, and it can be seen that, as the bandwidth B increases, a range may be detected with higher resolution.

Meanwhile, the controller 140 may be implemented to realize a virtual antenna having a 2D received beam distribution by driving the n*i transmitting antennas and the n*j receiving antennas with reference to antenna configuration related information.

Here, the virtual antenna refers to a 2D received beam distribution formed by adding all of received beam patterns appearing while shifting physical transmitting antennas to positions of physical receiving antennas.

Therefore, a logical virtual antenna with high spatial resolution may be implemented to have a 2D received beam distribution using a plurality of physical transmitting antennas and a plurality of physical receiving antennas. Consequently, the radar device may be provided to have high spatial resolution using a smaller number of physical transmitting and receiving antennas.

Meanwhile, the antenna configuration related information may be information defining stationary array information on the n*i transmitting antennas and the n*j receiving antennas, driving sequence information on the n*i transmitting antennas and the n*j receiving antennas, and 2D received beam form information on a dynamic virtual antenna according to a driving sequence of the n*j receiving antennas and the n*i transmitting antennas.

The controller 140 rearranges the range to the target object and the Doppler data for each of the reception channels, which are calculated by the n radar signal processors 110, in virtual antenna mapping data according to a 2D received beam form of the virtual antenna with reference to the antenna configuration related information. The controller 140 calculates a position of the target object from the virtual antenna mapping data.

Here, the virtual antenna mapping data refers to a computable data arrangement which is rearranged according to a general radar signal processing so as to allow the position of the target object to be calculated. According to an aspect of the present invention, the virtual antenna mapping data may be data which reflects a virtual antenna array, i.e., in which range-Doppler data of the target object is rearranged by being mapped to the virtual antenna array, so as to allow the position of the target object to be calculated.

Figure 3:
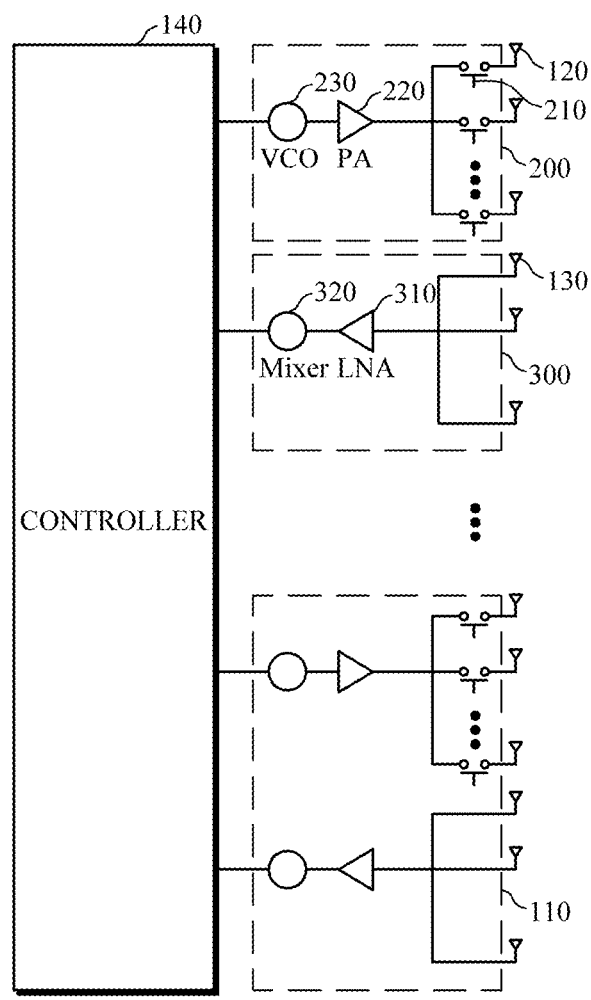
FIG. 3 is a block diagram illustrating a configuration of a radar signal processor of a radar device according to an embodiment of the present invention.

FIG. 3 is a block diagram illustrating a configuration of a radar signal processor of a radar device according to an embodiment of the present invention. As shown in FIG. 3, each of the n radar signal processors 110 includes a transmitting module 200 and a receiving module 300.

The transmitting module 200 is configured to sequentially transmit radar signals through the transmitting antennas 120 connected to the i transmission channels of each of the n radar signal processors 110 and includes switches 210, a power amplifier (PA) 220, and a frequency multiplier 230.

The switches 210 sequentially switch to select the transmitting antennas 120, which transmit the radar signals, so as to transmit the radar signals through the transmitting antennas 120 connected to the i transmission channels of each of the n radar signal processors 110 according to a transmission timing signal. In this case, the transmission timing signal for the radar signals may be transmitted from the controller 140.

The PA 220 amplifies a frequency signal output to the transmitting antenna 210.

The frequency multiplier 230 outputs power of an output frequency that is n (integer) times an input frequency to the PA 220.

The receiving module 300 is configured to collectively receive the radar signals, which are transmitted sequentially through the transmitting antennas 120 connected to the i transmission channels of each of the n radar signal processors 110, through the receiving antennas 130 connected to the j reception channels of each of the n radar signal processors 110 and includes a low noise amplifier (LNA) 310 and a mixer 320.

The LNA 310 performs low-noise amplification on weak frequency signals which are input through the receiving antennas 130 connected to the j reception channels of each of then radar signal processors 110.

The mixer 320 performs a frequency shift by multiplying frequency signals output from the transmitting antennas 120 by frequency signals received by the receiving antennas 130. The controller 140 detects the target object and calculates a position thereof using the above-described Equations from the frequency shift results obtained by the mixer 320 of each of the n radar signal processors 110.

According to an additional aspect of the present invention, in order to allow the radar device 100 to be used for security, the plurality of transmitting antennas 120 and the plurality of receiving antennas 130, which are provided in the radar device 100, may be arrayed to have a widely distributed surveillance region.

In this case, the n*i transmitting antennas 120 and the n*j receiving antennas 130 are arrayed to intersect with each other in a form of a straight or curved line, thereby having a widely distributed surveillance region, and a distribution interval between received beams on a received beam distribution image is implemented to be less than half of a received wavelength. In this case, as the number of the transmitting antennas 120 and the number of the receiving antennas 130, which are arrayed to intersect with each other in the form of a straight or curved line, increase, a more widely distributed surveillance region is achieved.

When the distribution interval between the received beams on the received beam distribution image is implemented to be less than or equal to half of the received wavelength, a grating lobe which is an undesirable radiation lobe may be reduced such that performance of the radar device may be improved. The grating lobe occurs when the distribution interval of the received beams on the received beam distribution image is greater than or equal to half of the received wavelength.

Meanwhile, when the n*i transmitting antennas 120 and the n*j receiving antennas 130 are arrayed to intersect with each other in the form of a straight or curved line, a distribution of the received beams on the received beam distribution image are more concentrated on a center of the received beam distribution image so as to reduce a side lobe such that the performance of the radar device may be improved. As the distribution of the received beams on the received beam distribution image is concentrated on the center of the received beam distribution image, the side lobe is increased.

Meanwhile, the n*i transmitting antennas 120 may be continuously or discontinuously arrayed with respect to adjacent transmitting antennas, and the n*j receiving antennas 130 may also be continuously or discontinuously arrayed with respect to adjacent receiving antennas.

As described above, the controller 140 controls the n radar signal processors 110 whenever the n*i transmitting antennas 120 sequentially or respectively transmit radar signals so as to allow all of the n*j receiving antennas 130 to collectively receive the radar signals.

In this case, the n*i transmitting antennas 120 and the n*j receiving antennas 130 may be arrayed so as to allow positions of the received beams formed by the radar signals which are received by the n*j receiving antennas 130 to not overlap on the received beam distribution image.

Figure 4:
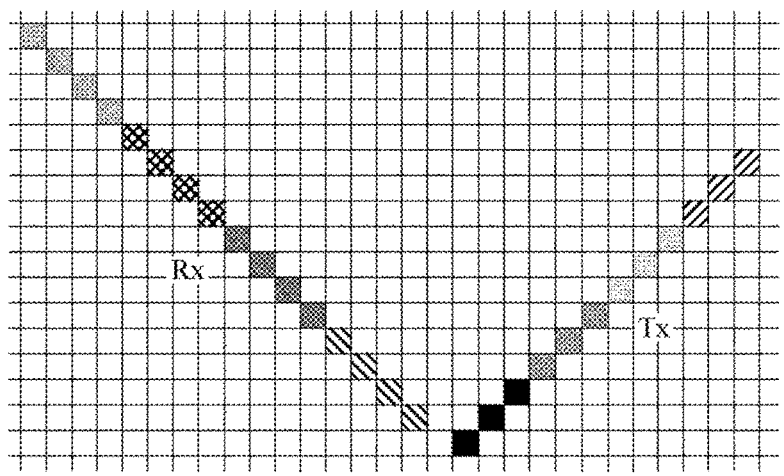
FIG. 4 is a diagram illustrating an antenna array structure of a radar device according to a first embodiment of the present invention.

FIG. 4 is a diagram illustrating an antenna array structure of a radar device according to a first embodiment of the present invention. FIG. 4 illustrates the first embodiment implemented such that 4*3 transmitting antennas 120 and 4*4 receiving antennas 130 are arrayed to intersect with each other at right angle in a form of straight lines which are inclined at −45 degrees/+45 degrees from the ground.

Figure 5:
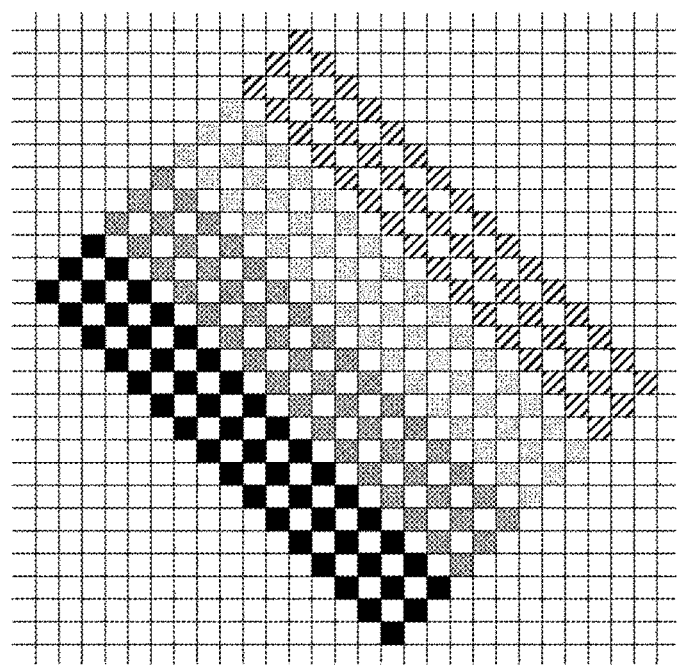
FIG. 5 is a diagram showing a received beam distribution image obtained by the antenna array structure according to the first embodiment shown in FIG. 1.

FIG. 5 is a diagram showing a received beam distribution image obtained by the antenna array structure according to the first embodiment shown in FIG. 1. As shown in FIG. 5, it can be seen that a received beam distribution has an inclined rectangular shape having a size of 12*16, thereby having a widely distributed surveillance region.

Figure 6:
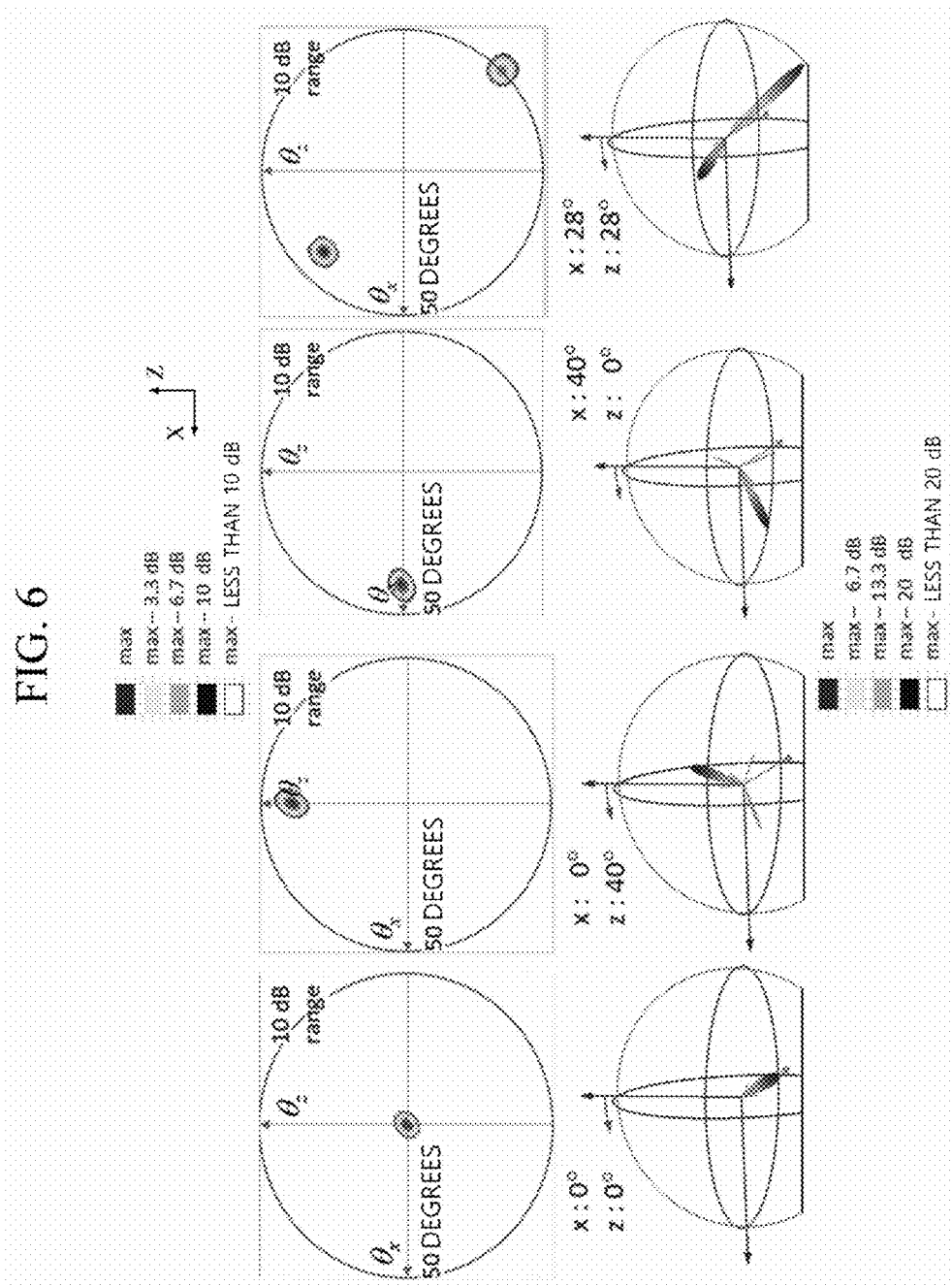
FIG. 6 shows graphs illustrating shapes of received beams formed by the antenna array structure according to the first embodiment shown in FIG. 4.

FIG. 6 shows graphs illustrating shapes of received beams formed by the antenna array structure according to the first embodiment shown in FIG. 4 that illustrate the shapes of the received beams which are viewed from an x-axis and a z-axis by performing fast Fourier transform (FFT) on radar signals received by the receiving antennas.

FIG. 6 shows graphs illustrating 2D and three-dimensional (3D) received beam patterns, from a left side of FIG. 6, when a tilt in an x-axis direction is zero degrees and a tilt in a z-axis direction is zero degrees, when the tilt in the x-axis direction is zero degrees and the tilt in the z-axis direction is 40 degrees, when the tilt in the x-axis direction is 40 degrees and the tilt in the z-axis direction is zero degrees, and when the tilt in the x-axis direction is 28 degrees and the tilt in the z-axis direction is 28 degrees.

Figure 7:
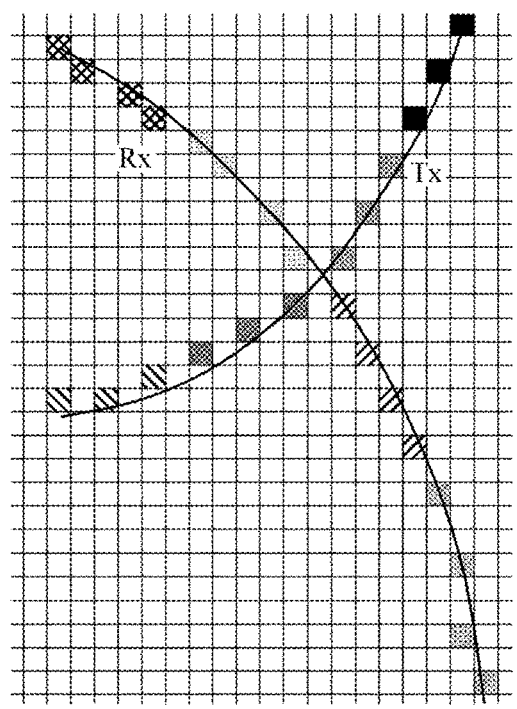
FIG. 7 is a diagram illustrating an antenna array structure of a radar device according to a second embodiment of the present invention.

FIG. 7 is a diagram illustrating an antenna array structure of a radar device according to a second embodiment of the present invention. FIG. 7 illustrates the second embodiment implemented such that 4*3 transmitting antennas 120 and 4*4 receiving antennas 130 are arrayed to intersect with each other in a form of curved lines.

Figure 8:
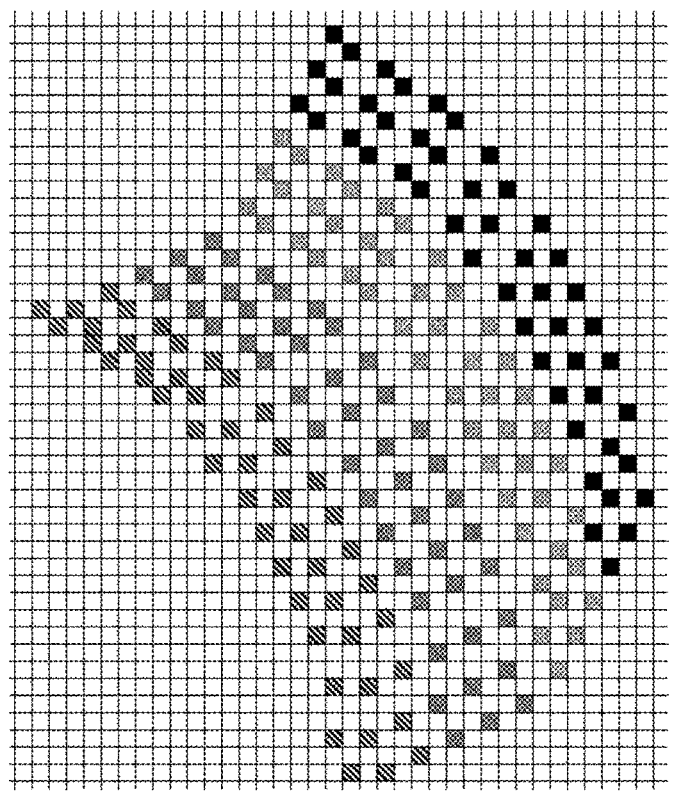
FIG. 8 is a diagram illustrating a received beam distribution image obtained by the antenna array structure according to the second embodiment shown in FIG. 7.

FIG. 8 is a diagram illustrating a received beam distribution image obtained by the antenna array structure according to the second embodiment shown in FIG. 7. As shown in FIG. 8, it can be seen that a received beam distribution has a curved rectangular shape having a size of 12*16, thereby having a widely distributed surveillance region.

Figure 9:
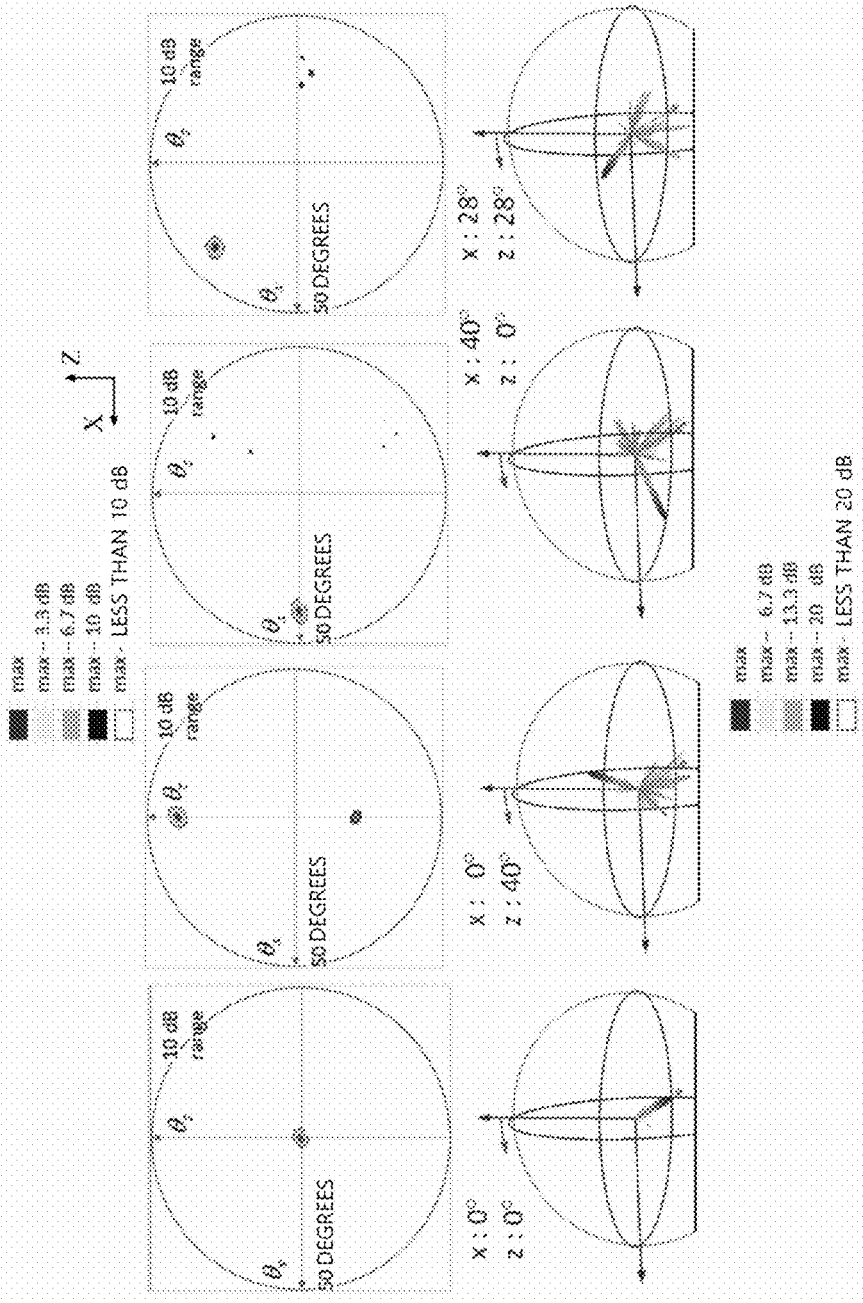
FIG. 9 shows graphs illustrating shapes of received beams formed by the antenna array structure according to the second embodiment shown in FIG. 7.

FIG. 9 shows graphs illustrating shapes of received beams formed by the antenna array structure according to the second embodiment shown in FIG. 7 that illustrate the shapes of the received beams which are viewed from the x-axis and the z-axis by performing FFT on radar signals received by the receiving antennas.

FIG. 9 shows graphs illustrating 2D and 3D received beam patterns, from a left side of FIG. 9, when a tilt in an x-axis direction is zero degrees and a tilt in a z-axis direction is zero degrees, when the tilt in the x-axis direction is zero degrees and the tilt in the z-axis direction is 40 degrees, when the tilt in the x-axis direction is 40 degrees and the tilt in the z-axis direction is zero degrees, and when the tilt in the x-axis direction is 28 degrees and the tilt in the z-axis direction is 28 degrees.

Figure 10:
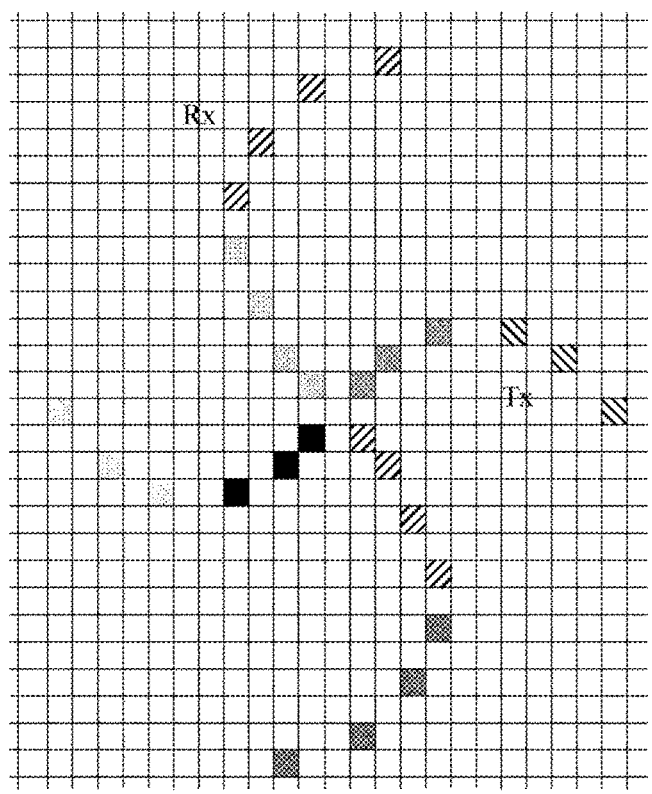
FIG. 10 is a diagram illustrating an antenna array structure of a radar device according to a third embodiment of the present invention.

FIG. 10 is a diagram illustrating an antenna array structure of a radar device according to a third embodiment of the present invention. FIG. 10 illustrates the third embodiment implemented such that 4*3 transmitting antennas 120 and 4*4 receiving antennas 130 are arrayed to intersect with each other in a form of helical lines.

Figure 11:
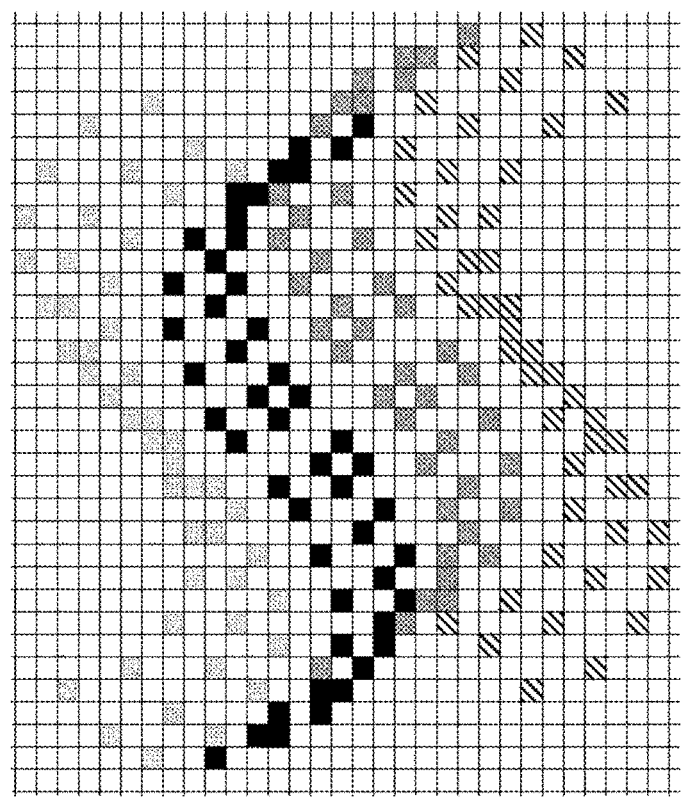
FIG. 11 is a diagram illustrating a received beam distribution image obtained by the antenna array structure according to the third embodiment shown in FIG. 10.

FIG. 11 is a diagram illustrating a received beam distribution image obtained by the antenna array structure according to the third embodiment shown in FIG. 10. As shown in FIG. 11, it can be seen that a received beam distribution has a rectangular wave shape having a size of 12*16, thereby having a widely distributed surveillance region.

Figure 12:
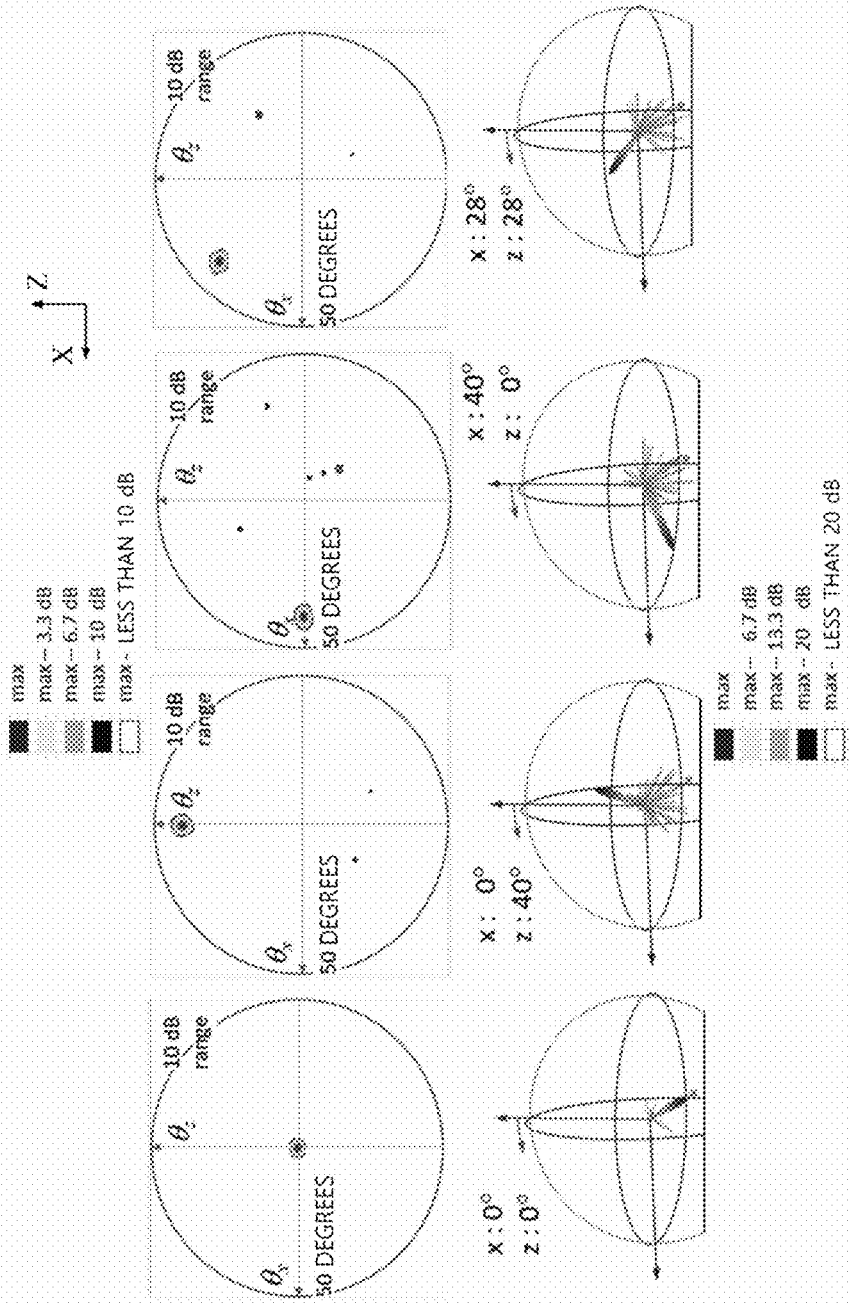
FIG. 12 shows graphs illustrating shapes of received beams formed by the antenna array structure according to the third embodiment shown in FIG. 10.

FIG. 12 shows graphs illustrating shapes of received beams formed by the antenna array structure according to the third embodiment shown in FIG. 10 that illustrate the shapes of the received beams which are viewed from the x-axis and the z-axis by performing FFT on radar signals received by the receiving antennas.

FIG. 12 shows graphs illustrating 2D and 3D received beam patterns, from a left side of FIG. 12, when a tilt in an x-axis direction is zero degrees and a tilt in a z-axis direction is zero degrees, when the tilt in the x-axis direction is zero degrees and the tilt in the z-axis direction is 40 degrees, when the tilt in the x-axis direction is 40 degrees and the tilt in the z-axis direction is zero degrees, and when the tilt in the x-axis direction is 28 degrees and the tilt in the z-axis direction is 28 degrees.

As described above, in accordance with the present invention, the plurality of transmitting antennas and the plurality of receiving antennas, which are provided in a radar device, are arrayed to intersect with each other in the form of a straight or curved line, thereby having a widely distributed surveillance region. Consequently, the radar device may survey a wide region. Accordingly, the radar device may be used for security and the like.

Meanwhile, the distribution interval between the received beams on the received beam distribution image is implemented to be less than or equal to half of the received wavelength such that a grating lobe which is an undesirable radiation lobe may be reduced. Consequently, performance of the radar device may be improved.

Further, a distribution of the received beams on the received beam distribution image is more concentrated on a center of the received beam distribution image, thereby reducing a side lobe. Consequently, the performance of the radar device may be improved.

According to an additional aspect of the present invention, in order to allow the radar device 100 to be used for a vehicle, the plurality of transmitting antennas 120 and the plurality of receiving antennas 130, which are provided in the radar device 100, may be arrayed to have a concentratedly distributed surveillance region.

In this case, instead of all of the n*i transmitting antennas 120 and the n*j receiving antennas 130 being arrayed on straight lines, some among the n*i transmitting antennas 120 and the n*j receiving antennas 130 are arrayed on straight lines and the remaining antennas thereamong are arrayed to be alternated. Thus, some positions of received beams formed by radar signals which are received by the n*j receiving antennas 130 are represented as spaces on a received beam distribution image as well as achieving a concentratedly distributed surveillance region, and a distribution interval of the received beams on the received beam distribution image is implemented to be less than half of a received wavelength.

When the distribution interval between the received beams on the received beam distribution image is implemented to be less than or equal to half of the received wavelength, a grating lobe which is an undesirable radiation lobe may be reduced such that performance of the radar device may be improved. The grating lobe occurs when the distribution interval of the received beams on the received beam distribution image is greater than or equal to half of the received wavelength.

Meanwhile, when some among the n*i transmitting antennas 120 and the n*j receiving antennas 130 are arrayed on straight lines and the remaining antenna thereamong are arrayed to be alternated instead of all of the n*i transmitting antennas 120 and the n*j receiving antennas 130 being arrayed on the straight lines, the distribution of the received beams on the received beam distribution image are more concentrated on a center of the received beam distribution image to reduce the side lobe such that the performance of the radar device may be improved. As the distribution of the received beams on the received beam distribution image are concentrated on the center of the received beam distribution image, the side lobe is decreased.

Meanwhile, the n*i transmitting antennas 120 may be continuously or discontinuously arrayed with respect to adjacent transmitting antennas, and the n*j receiving antennas 130 may also be continuously or discontinuously arrayed with respect to adjacent receiving antennas.

As described above, the controller 140 controls the n radar signal processors 110 whenever the n*i transmitting antennas 120 sequentially or respectively transmit radar signals so as to allow all of the n*j receiving antennas 130 to collectively receive the radar signals.

In this case, the n*i transmitting antennas 120 and the n*j receiving antennas 130 may be arrayed so as to allow positions of the received beams formed by the radar signals, which are received by the n*j receiving antennas 130, to not overlap on the received beam distribution image.

Figure 13:
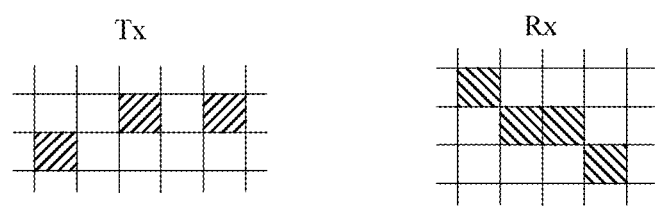
FIG. 13 is a diagram illustrating an antenna array structure of a radar device according to a fourth embodiment of the present invention.

FIG. 13 is a diagram illustrating an antenna array structure of a radar device according to a fourth embodiment of the present invention. FIG. 13 illustrates the fourth embodiment implemented such that some among 4*3 transmitting antennas 120 and 4*4 receiving antennas 130 are arrayed on straight lines and the remaining antennas thereamong are arrayed to be alternated.

Figure 14:
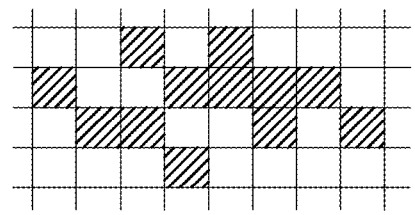
FIG. 14 is a diagram showing a received beam distribution image obtained by the antenna array structure according to the fourth embodiment shown in FIG. 13.

FIG. 14 is a diagram showing a received beam distribution image obtained by the antenna array structure according to the fourth embodiment shown in FIG. 4. As shown in FIG. 14, it can be seen that some positions of received beams formed by radar signals, which are received by the receiving antennas, exhibit a concentrated distribution while being represented as spaces on a received beam distribution image, thereby having a concentratedly distributed surveillance region.

Figure 15:
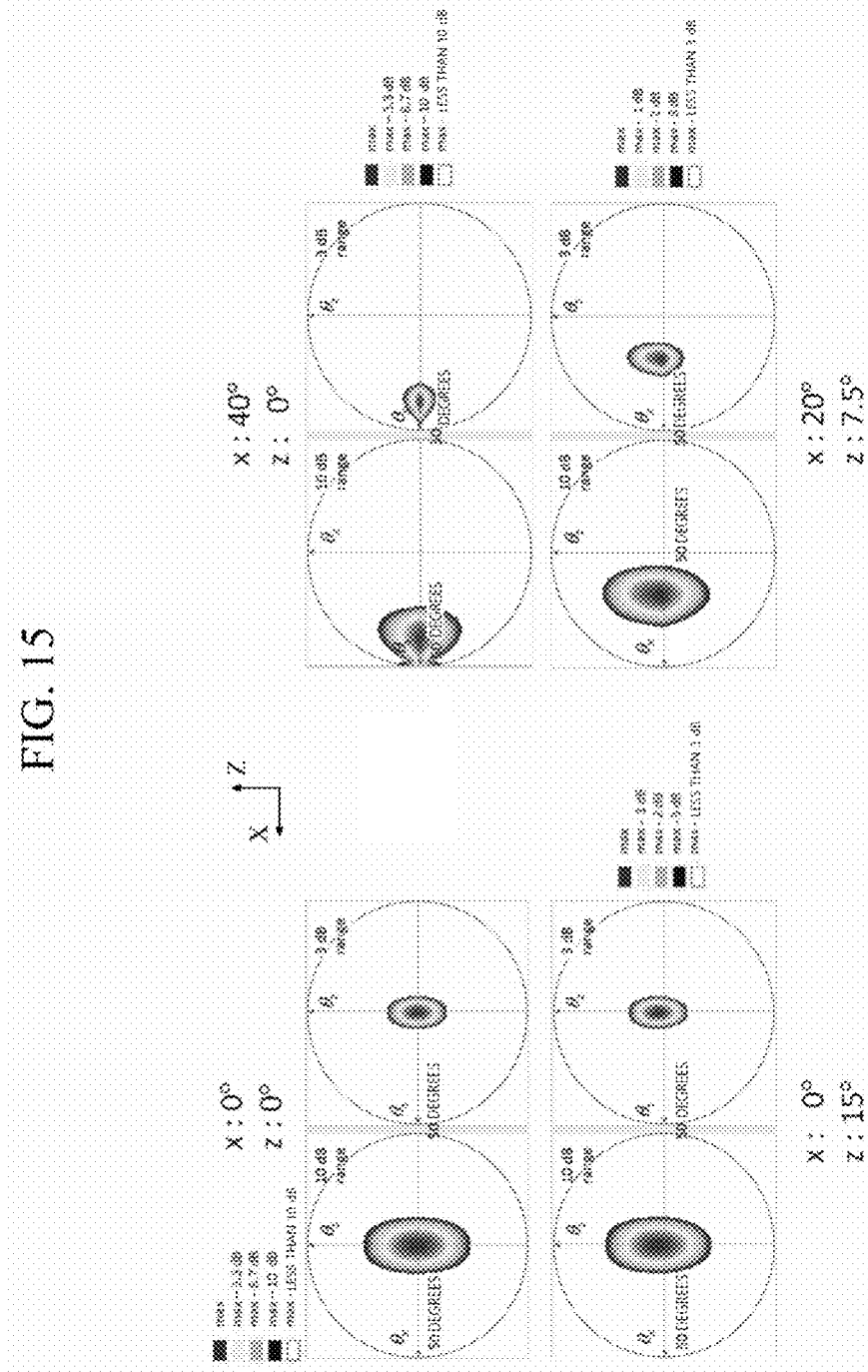
FIG. 15 shows graphs illustrating shapes of received beams formed by the antenna array structure according to the fourth embodiment shown in FIG. 13.

FIG. 15 shows graphs illustrating shapes of received beams formed by the antenna array structure according to the fourth embodiment shown in FIG. 13 that illustrate the shapes of the received beams which are viewed from the x-axis and the z-axis by performing FFT on the radar signals received by the receiving antennas.

Graphs on an upper left side of FIG. 15 show received beam patterns when a tilt in the x-axis direction is zero degrees and a tilt in the z-axis direction is zero degrees, graphs on an upper right side thereof show received beam patterns when the tilt in the x-axis direction is 40 degrees and the tilt in the z-axis direction is zero degrees, graphs on a lower left side thereof show received beam patterns when the tilt in the x-axis direction is zero degrees and the tilt in the z-axis direction is 15 degrees, and graphs on a lower right side thereof show received beam patterns when the tilt in the x-axis direction is 20 degrees and the tilt in the z-axis direction is 7.5 degrees.

Figure 16:
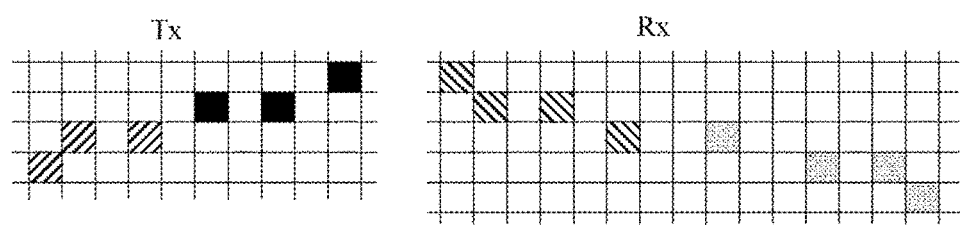
FIG. 16 is a diagram illustrating an antenna array structure of a radar device according to a fifth embodiment of the present invention.

FIG. 16 is a diagram illustrating an antenna array structure of a radar device according to a fifth embodiment of the present invention. FIG. 16 illustrates the fifth embodiment implemented such that some among 2*3 transmitting antennas 120 and 2*4 receiving antennas 130 are arrayed on straight lines and the remaining antennas thereamong are arrayed to be alternated.

Figure 17:
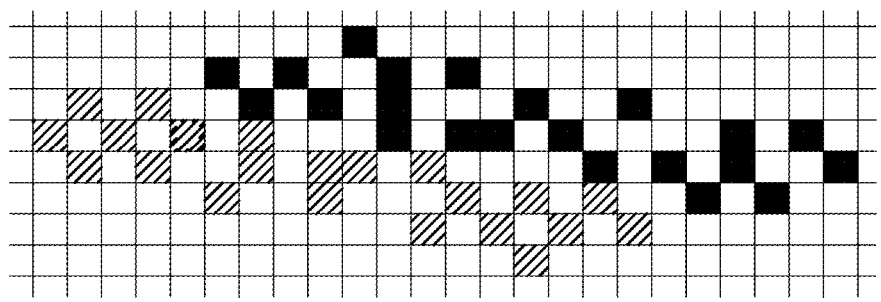
FIG. 17 is a diagram illustrating a received beam distribution image obtained by the antenna array structure according to the fifth embodiment shown in FIG. 16.

FIG. 17 is a diagram illustrating a received beam distribution image obtained by the antenna array structure according to the fifth embodiment shown in FIG. 16. As shown in FIG. 17, it can be seen that some positions of received beams formed by radar signals, which are received by the receiving antennas, exhibit a concentrated distribution similar to an elliptical shape while being represented as spaces on a received beam distribution image, thereby having a concentratedly distributed surveillance region.

Figure 18:
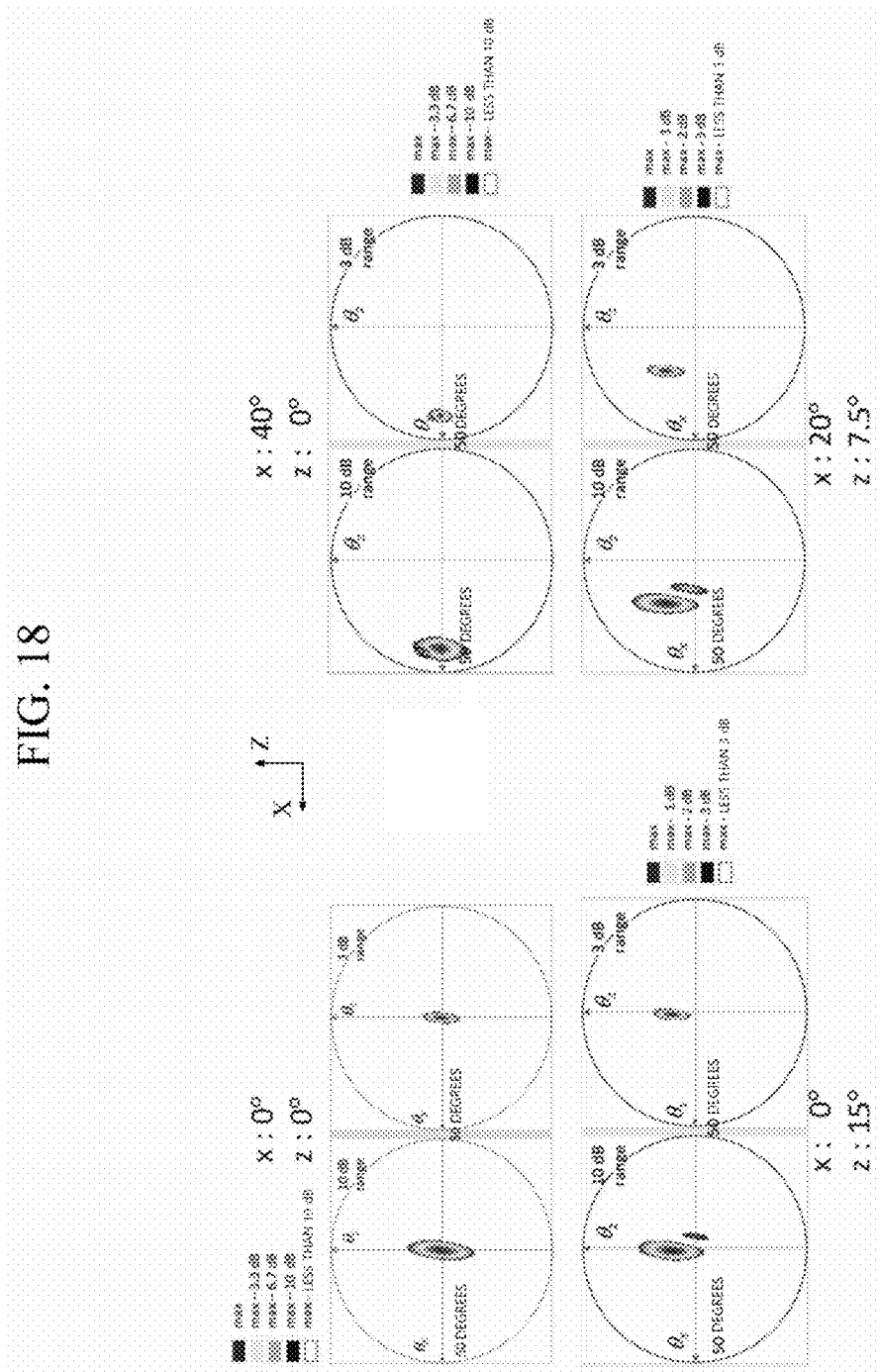
FIG. 18 shows graphs illustrating shapes of received beams formed by the antenna array structure according to the fifth embodiment shown in FIG. 16.

FIG. 18 shows graphs illustrating shapes of received beams formed by the antenna array structure according to the fifth embodiment shown in FIG. 16 that illustrate the shapes of the received beams which are viewed from an x-axis and a z-axis by performing FFT on the radar signals received by the receiving antennas.

Graphs on an upper left side of FIG. 18 show received beam patterns when a tilt in the x-axis direction is zero degrees and a tilt in the z-axis direction is zero degrees, graphs on an upper right side thereof show received beam patterns when the tilt in the x-axis direction is 40 degrees and the tilt in the z-axis direction is zero degrees, graphs on a lower left side thereof show received beam patterns when the tilt in the x-axis direction is zero degrees and the tilt in the z-axis direction is 15 degrees, and graphs on a lower right side thereof show received beam patterns when the tilt in the x-axis direction is 20 degrees and the tilt in the z-axis direction is 7.5 degrees.

Figure 19:
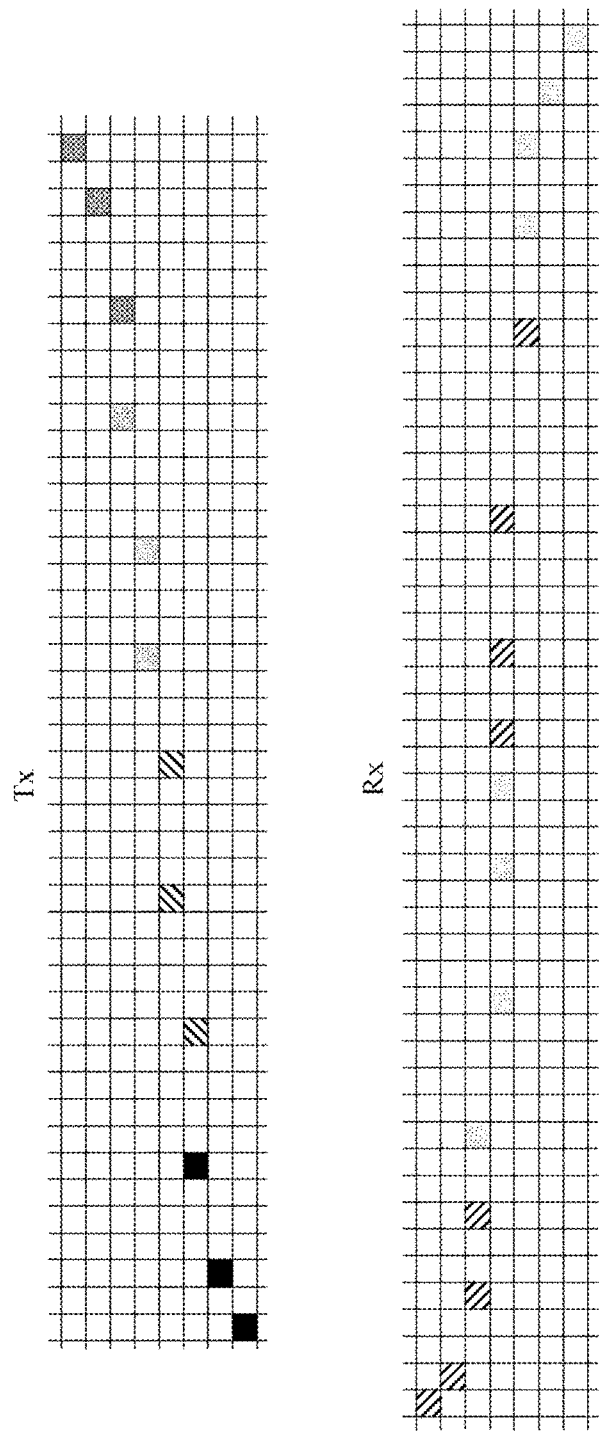
FIG. 19 is a diagram illustrating an antenna array structure of a radar device according to a sixth embodiment of the present invention.

FIG. 19 is a diagram illustrating an antenna array structure of a radar device according to a sixth embodiment of the present invention. FIG. 19 illustrates the sixth embodiment implemented such that some among 4*3 transmitting antennas 120 and 4*4 receiving antennas 130 are arrayed on straight lines and the remaining antennas thereamong are arrayed to be alternated.

Figure 20:
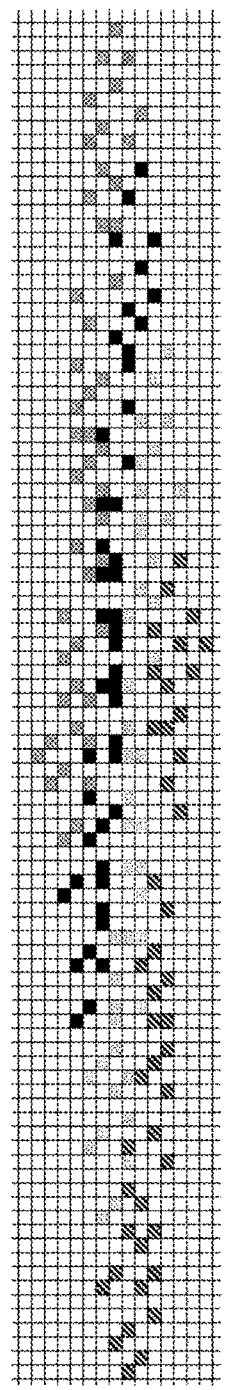
FIG. 20 is a diagram illustrating a received beam distribution image obtained by the antenna array structure according to the sixth embodiment shown in FIG. 19.

FIG. 20 is a diagram illustrating a received beam distribution image obtained by the antenna array structure according to the sixth embodiment shown in FIG. 19. As shown in FIG. 20, it can be seen that some positions of received beams formed by radar signals, which are received by the receiving antennas, exhibit a concentrated distribution similar to a long elliptical shape while being represented as spaces on a received beam distribution image, thereby having a concentratedly distributed surveillance region.

Figure 21:
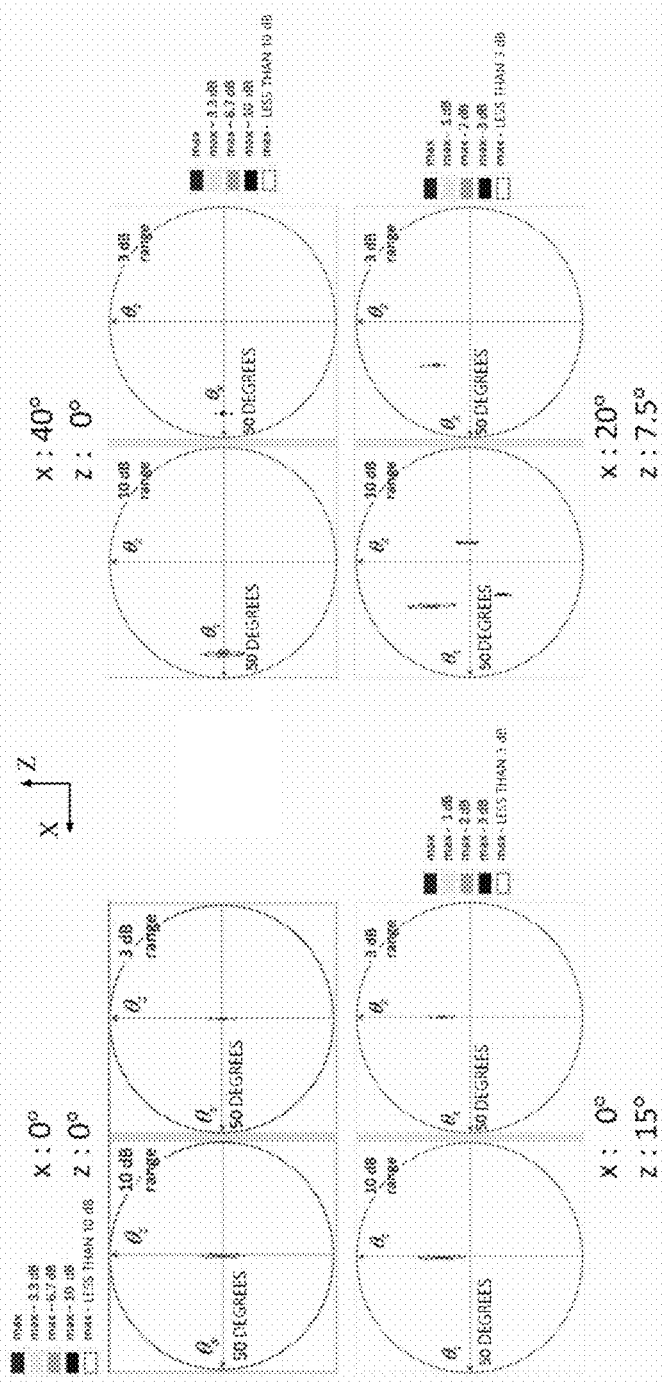
FIG. 21 shows graphs illustrating shapes of received beams formed by the antenna array structure according to the sixth embodiment shown in FIG. 19.

FIG. 21 shows graphs illustrating shapes of received beams formed by the antenna array structure according to the sixth embodiment shown in FIG. 19 that illustrate the shapes of the received beams which are viewed from an x-axis and a z-axis by performing FFT on the radar signals received by the receiving antennas.

Graphs on an upper left side of FIG. 21 show received beam patterns when a tilt in the x-axis direction is zero degrees and a tilt in the z-axis direction is zero degrees, graphs on an upper right side thereof show received beam patterns when the tilt in the x-axis direction is 40 degrees and the tilt in the z-axis direction is zero degrees, graphs on a lower left side thereof show received beam patterns when the tilt in the x-axis direction is zero degrees and the tilt in the z-axis direction is 15 degrees, and graphs on a lower right side thereof show received beam patterns when the tilt in the x-axis direction is 20 degrees and the tilt in the z-axis direction is 7.5 degrees.

As described above, in accordance with the present invention, instead of all of the plurality of transmitting antennas and the plurality of receiving antennas, which are provided in the radar device, being arrayed on straight lines, some among the plurality of transmitting antennas and the plurality of receiving antennas are arrayed in the form of a straight line and the remaining antennas thereamong are arrayed to be alternated, thereby having a concentratedly distributed surveillance region. Consequently, the radar device may concentratedly survey a region of interest. Accordingly, the radar device may be used for a vehicle and the like.

Meanwhile, the distribution interval between the received beams on the received beam distribution image is implemented to be less than or equal to half of the received wavelength such that a grating lobe which is an undesirable radiation lobe may be reduced. Consequently, performance of the radar device may be improved.

Further, a distribution of the received beams on the received beam distribution image is more concentrated on a center of the received beam distribution image, thereby reducing a side lobe. Consequently, the performance of the radar device may be improved.

As described above, in accordance with the present invention, a virtual antenna with high spatial resolution can be implemented to have a 2D received beam distribution using a plurality of transmitting antennas and a plurality of receiving antennas. Consequently, a radar device can be provided to have high spatial resolution using a smaller number of physical transmitting and receiving antennas.

Further, in accordance with the present invention, the plurality of transmitting antennas and the plurality of receiving antennas, which are provided in the radar device, are arrayed to intersect with each other in the form of a straight or curved line, thereby having a widely distributed surveillance region. Consequently, the radar device can survey a wide region.

Further, in accordance with the present invention, instead of all of the plurality of transmitting antennas and the plurality of receiving antennas, which are provided in the radar device, being arrayed on straight lines, some among the plurality of transmitting antennas and the plurality of receiving antennas are arrayed in the form of a straight line and the remaining antennas thereamong are arrayed to be alternated, thereby having a concentratedly distributed surveillance region. Consequently, the radar device can concentratedly survey a region of interest.

Further, in accordance with the present invention, a distribution interval between received beams on a received beam distribution image is implemented to be less than or equal to half of a received wavelength, thereby removing a grating lobe which is an undesirable radiation lobe. Consequently, performance of the radar device can be improved.

Further, in accordance with the present invention, a distribution of the received beams on the received beam distribution image is implemented to be more concentrated on a center of the received beam distribution image, thereby reducing a side lobe. Consequently, the performance of the radar device can be improved.

The various embodiments disclosed herein and illustrated in the accompanying drawings are merely specific examples for the purpose of aiding understanding and are not intended to limit the scope of the various embodiments of the present invention.

Therefore, it should be construed that, in addition to the embodiments described herein, all alternations and modifications derived from the technical spirit of the various embodiments of the present invention fall within the scope of the various embodiments of the present invention.

INDUSTRIAL APPLICABILITY

The present invention is industrially applicable in the field of radar antenna technology and application thereof.

The invention claimed is:

1. A radar device comprising:
   n radar signal processors, each of which includes i transmission channels and j reception channels, configured to transmit radar signals through the i transmission channels, receive the radar signals reflected from a target object through the j reception channels, and process the received radar signals, thereby calculating a range to the target object and Doppler data for each of the j reception channels;
   n*i physical transmitting antennas connected to the i transmission channels of each of the n radar signal processors and configured to transmit the radar signals;
   n*j physical receiving antennas connected to the j reception channels of each of the n radar signal processors and configured to receive the radar signals reflected from the target object; and
   a controller configured to control operations of the n radar signal processors and generate a virtual antenna having a two-dimensional (2D) distribution of received beams by driving the n*i transmitting antennas and the n*j receiving antennas with reference to antenna configuration related information,
   wherein the distribution of the received beams on a received beam distribution image reflecting the virtual antenna are more concentrated on a center of the received beam distribution image so as to reduce a side lobe,
   wherein the controller generates the virtual antenna having the 2D received beam distribution formed by adding all of received beam patterns appearing while shifting physical transmitting antennas to positions of physical receiving antennas, wherein the controller rearranges the range to the target object and the Doppler data for each of the reception channels, which are calculated by the n radar signal processors, in virtual antenna mapping data according to a 2D received beam form of the virtual antenna with reference to the antenna configuration related information.

2. The radar device of claim 1, wherein the antenna configuration related information defines stationary array information on the n*i transmitting antennas and the n*j receiving antennas, driving sequence information on the n*i transmitting antennas and the n*j receiving antennas, and 2D received beam form information on a dynamic virtual antenna according to a driving sequence of the n*i transmitting antennas and the n*j receiving antennas.

3. The radar device of claim 2, wherein the controller calculates a position of the target object from virtual antenna mapping data in which the range to the target object and the Doppler data for each of the reception channels, which are calculated by the n radar signal processors, are rearranged according to a 2D received beam form of the virtual antenna with reference to the antenna configuration related information.

4. The radar device of claim 2, wherein:
the n*i transmitting antennas and the n*j receiving antennas are arrayed to intersect with each other in a form of a straight or curved line, thereby having a widely distributed surveillance region; and
a distribution interval between received beams on the received beam distribution image is less than half of a received wavelength.

5. The radar device of claim 2, wherein:
instead of all of the n*i transmitting antennas and the n*j receiving antennas being arrayed on straight lines, some among the n*i transmitting antennas and the n*j receiving antennas are arrayed on the straight lines and the remaining antennas thereamong are arrayed to be alternated such that some positions of received beams formed by the radar signals, which are received by the n*j receiving antennas, are represented as spaces on the received beam distribution image as well as obtaining a concentratedly distributed surveillance region;
a distribution interval of the received beams on the received beam distribution image is less than half of a received wavelength.

6. The radar device of claim 2, wherein the n*i transmitting antennas are continuously or discontinuously arrayed with respect to adjacent transmitting antennas.

7. The radar device of claim 2, wherein the n*j receiving antennas are continuously or discontinuously arrayed with respect to adjacent receiving antennas.

8. The radar device of claim 2, wherein the controller controls the n radar signal processors whenever the n*i transmitting antennas sequentially or respectively transmit the radar signals so as to allow all of the n*j receiving antennas to collectively receive the radar signals.

9. The radar device of claim 2, wherein the n*i transmitting antennas and the n*j receiving antennas are arrayed so as to allow positions of received beams formed by the radar signals, which are received by the n*j receiving antennas, to not overlap on the received beam distribution image.

* * * * *